United States Patent [19]

Chapdelaine et al.

[11] Patent Number: 4,940,589

[45] Date of Patent: Jul. 10, 1990

[54] USE OF AQUEOUS THAUMATIN TO ENHANCE SWEETNESS OF CHEWING GUM

[75] Inventors: Albert H. Chapdelaine, Naperville; Robert J. Yatka, Orland Park, both of Ill.

[73] Assignee: Wm. Wrigley Jr. Company, Chicago, Ill.

[21] Appl. No.: 280,492

[22] Filed: Dec. 6, 1988

[51] Int. Cl.$^5$ ............................................. A23G 3/30
[52] U.S. Cl. ........................................ 426/3; 426/548; 426/804
[58] Field of Search .......................... 426/36, 548, 804

[56] References Cited

U.S. PATENT DOCUMENTS

| | | | |
|---|---|---|---|
| 4,228,198 | 10/1980 | Burge et al. | 426/548 |
| 4,252,829 | 2/1981 | Terrevazzi | 426/3 |
| 4,412,984 | 11/1985 | van der Loo et al. | 426/548 X |
| 4,562,076 | 12/1985 | Arnold et al. | 426/5 |
| 4,642,235 | 2/1987 | Reed et al. | 426/5 |
| 4,722,844 | 2/1988 | Ozawa et al. | 426/3 |
| 4,786,491 | 11/1988 | Patel | 426/658 |

*Primary Examiner*—Jeanette Hunter
*Attorney, Agent, or Firm*—Willian Brinks Olds Hofer Gilson & Lione

[57] ABSTRACT

A method of adding the high intensity sweetener thaumatin to chewing gum ingredients via an aqueous solution of thaumatin, distilled water and preservative—preferably glycerin or propylene glycol.

6 Claims, No Drawings

USE OF AQUEOUS THAUMATIN TO ENHANCE SWEETNESS OF CHEWING GUM

BACKGROUND OF THE INVENTION

The present invention relates to chewing gums having improved use of thaumatin, a high intensity sweetener and flavor enhancer, and their method of manufacture.

In order to reduce cariogenicity, many chewing gums employ sugar substitutes to provide sweetness and flavor. Sugar substitutes include high intensity sweeteners. High intensity sweeteners exhibit a greater sweetness than identical amounts of sucrose. High intensity sweeteners are known to be hundreds and sometimes thousands of times sweeter than sugar.

One such sweetener, thaumatin, is a proteinaceous substance obtained from the fruit of the tropic plant Thaumatococcus daniellii which grows in tropical Africa. Thaumatin is about two thousand to three thousand times sweeter than sucrose and is known to have a lingering sweet aftertaste.

Thaumatin, apart from its intense sweetness, is recognized as a high potency flavor and sweetness adjuvant capable of perpetuating sweetness and flavor in chewing gum compositions. See, for example, Vander Loo et al., U.S. Pat. No. 4,412,984, and Burge et al., U.S. Pat. No. 4,228,198.

In the past, thaumatin has been added to gum in a powder form or physically mixed or encapsulated to a powder form. Unfortunately, thaumatin has very specific handling problems associated with it. Thaumatin is a very light, fluffy material which can cause allergic reactions when atmospherically suspended in its powder state. However, the aforesaid handling problems do not exist when thaumatin is in an aqueous solution.

A method of adding thaumatin to chewing gum ingredients via an aqueous solution which provides the same long lasting sweetness effect on chewing gum as powdered thaumatin would thus constitute an advance in the art. Such a method would be readily accepted and enjoy commercial success.

It is therefore an object of the present invention to provide for a method of adding aqueous thaumatin to chewing gum, such a method providing for the same sweetness enhancing effect on chewing gum as does the addition of powdered thaumatin.

These and other objects will become apparent in light of the following specification. It is to be understood, however, that the above-mentioned objectives are not to be considered a limitation of the present invention, the scope of which is delineated in the appended claims.

SUMMARY OF THE INVENTION

In accordance with one embodiment of the present invention, the use of an aqueous solution of thaumatin comprising of a water miscible preservative, water, and thaumatin is contemplated in the manufacture of chewing gum. The method comprises adding the thaumatin solution to the other chewing gum ingredients.

In accordance with another embodiment of the present invention, the water miscible preservative comprises propylene glycol or glycerin.

In accordance with a further embodiment of the present invention, other water miscible preservatives may be substituted for or used in combination with glycerin and/or propylene glycol.

DETAILED DESCRIPTION OF PREFERRED EMBODIMENTS

It has now been discovered that when an aqueous thaumatin solution comprising a water miscible preservative is added to chewing gum ingredients, it provides for the identical delayed sweetness release as powdered thaumatin.

In the past, thaumatin was added to chewing gum in a powdered form or physically mixed or encapsulated to a powder form. Depending on the encapsulant, thaumatin sweetness could be released at various times during chewing. It was theorized that thaumatin's delayed release was due to it becoming bound in the gum base matrix. Encapsulant seemed to reduce the degree to which thaumatin interacted with the gum base matrix thus providing for a quicker release of thaumatin's sweetness. Conversely, absent encapsulant, powdered thaumatin seemed to more readily interact with the gum base matrix thus providing for a greatly delayed release of thaumatin's sweetness. The addition of an aqueous thaumatin solution provides for the identical delayed sweetness release as does the addition of powdered thaumatin.

An advantage of the present invention is that the loss of thaumatin to the atmosphere during handling is reduced. Thaumatin is available as a very fine powder and when handled in significant quantities often becomes suspended in the atmosphere creating an unsafe environment. Manufacturing personnel may be sensitive to the fine particles in the atmosphere and may react adversely. According to the present invention, adding aqueous thaumatin to other chewing gum ingredients reduces this hazard.

These and other advantages will become apparent to those skilled in the art in light of the following disclosure. It is to be understood, however, that the present invention is not intended to be limited by the advantages discussed or contemplated.

In accordance with the present invention, thaumatin is added to the chewing gum ingredients in the form of an aqueous solution.

Any aqueous thaumatin solution is an appropriate starting material. Preferably, however, said starting thaumatin solution will be GL-95 procured from Tate & Lyle. Tate & Lyle supplies the GL-95 solution in three variant forms comprising 1%, 5%, or 10% thaumatin. Preferably, any of the above GL-95 solutions is used as a starting material in the present invention.

In accordance with one embodiment, the aqueous solution of thaumatin added to the chewing gum ingredients comprises between about 1% and approximately 25% by weight thaumatin and preferably about 15% by weight thaumatin; between about 20% and about 80% by weight water and preferably about 55% by weight water; between about 15% and about 60% by weight glycerin and preferably about 30% by weight glycerin.

In accordance with another embodiment of the present invention, the aqueous thaumatin solution added to the chewing gum ingredients comprises between about 1% and about 25% by weight thaumatin and preferably 15% by weight thaumatin; between about 20% and about 80% by weight water and preferably 55% by weight water; between about 15% and about 60% by weight propylene glycol and preferably about 30% by weight propylene glycol.

In accordance with yet another embodiment of the present invention, the aqueous thaumatin solution will be added in such amounts and concentrations so that the thaumatin present in the chewing gum will be between about 25 ppm and about 600 ppm by weight of the chewing gum and preferably between about 90 ppm and about 200 ppm by weight of the chewing gum.

Thaumatin, being a protein, is very unstable in water undergoing rapid bacteriological degradation. However, the addition of water miscibile preservatives such as glycerin, propylene glycol, or other similar preservatives, operate to maintain the integrity and stability of the aqueous thaumatin solution.

In general, a chewing gum composition comprises a water soluble bulk portion, a water insoluble chewable gum base portion, and, typically, water insoluble flavors. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobuylene-isoprene copolymer, styrene butadiene rubber as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include paraffin, microcrystalline and natural waxes such as beeswax and carnauba. The insoluble gum base constitutes between approximately 5 to 95 weight percent of the gum. Preferably the insoluble gum base comprises about 10 to approximately 50 weight percent of the gum and more preferably about 20 to approximately 30 weight percent.

The gum base typically also includes a filler component. The filler component such as calcium carbonate, magnesium carbonate, talc, dicalcium phospate and the like. The filler may constitute between about 5 to approximately 60 weight percent of the gum base. Preferably, the filler comprises about 5 to 50 weight percent of the chewing gum base.

Gum base typically also contains softeners, including glycerol monostearate and glycerol triacetate. Further, gum bases may also contain optional ingredients such as antioxidents, colors and emulsifiers. The present invention contemplates employing any commercially acceptable gum base.

The water soluble portion of chewing gum may further comprise softeners, sweeteners, flavors and combinations thereof. The softeners are added to the chewing gum in order to optimize the chewability and mouthfeel of the gum. Softeners, also known in the art as plasticizers or plasticizing agents, generally constitute between approximately 0.5 to approximately 15 weight percent of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in gum.

In addition to the thaumatin high intensity sweetener already discussed, other sweeteners are also contemplated by the present invention for direct addition to the chewing gum. These sweeteners include both sugar and sugarless components. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination. Also contemplated for direct addition to the gum are relatively faster releasing high intensity sweeteners such as aspartame, sucralose, acesulfame-K, alitame, and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as an aqueous sweetener solution.

A flavor may be present in a chewing gum in an amount from approximately 0.1 to about 10 weight percent and preferably from about 0.5 to approximately 3.0 weight percent of the gum. Flavors contemplated by the present invention include any liquid flavoring which is a food acceptable quality. The flavor may comprise essential oils, synthetic flavors, or mixtures thereof including but not limited to oils derived from plants and fruits such as citrus oils, fruit essences, peppermint oil, spearmint oil, clove oil, oil of wintergreen, anise, and the like. Artificial flavoring components are also contemplated by the present invention. Those skilled in the art will recognize that the natural and artificial flavors may be combined in any manner. All such flavors and blends are contemplated by the present invention.

Actual ingredients such as colors, emulsifiers and pharmaceutical agents may be added to the chewing gum.

In general, chewing gum is manufactured by sequentially adding the various chewing gum ingredients to any commercially available known in the art. After the ingredients have been thoroughly mixed, the gum mass is discharged from the mixer and shaped into the desired forms such as rolling into sheets and cutting into sticks, extruding into chunks or casting into pellets.

Generally, the ingredients are mixed by first melting the gum base and adding it to the running mixer. Base may also be melted in the mixer itself. Color may also be added at this time. A softener such as glycerin may then be added next along with syrup and a portion of bulking agent. Further portions of the bulking agents may be added to the mixer.

It is to be understood, that in proper conditions the aqueous thaumatin of the present invention may be added at any time during the gum manufacturing process.

The entire mixing procedure typically takes from 5 to 15 minutes, but longer mixing times may sometimes be required. Those skilled in the art will recognize that variations to the above-described procedure may be followed. It is to be understood that an equivalent of changes and modifications of the embodiments described above are also contemplated by the present invention. The following examples are not to be construed as limitation upon the present invention, but are included merely as an illustration of various embodiments.

EXAMPLE 1

A chewing gum is prepared by mixing ingredients according to the formulation of Table 1. The gum formula was used to test three variant samples. Sample 1 was comprised of a solution of 15% thaumatin, 55.25% distilled water, and 29.75% glycerin. A 0.2 gram quantity of this sample was then added to the gum sample described in Table 1 so that the thaumatin present in the chewing gum was 30 ppm by weight of the chewing gum. Sample 2 was comprised of powder thaumatin. A 0.03 gram quantity of this sample was then added to the gum sample described in Table 1 so that the thaumatin present in the chewing gum was 30 ppm by weight of the chewing gum. Sample 3 was comprised of the gum described in Table 1.

TABLE 1

| | |
|---|---|
| Base | 19.22% |
| Lecithin | 0.15% |
| Syrup | 14.75% |
| Glycerin | 1.30% |
| Sugar | 63.45% |
| Flavor | 1.13% |
| | 100.00% |

Chewing tests by several expert panelist evaluating the three gum samples suggested that Samples 1 and 2 had improved quality compared to Sample 3. Accordingly, the use of an aqueous system and the addition of glycerin to chewing gum ingredients does not adversely effect a sugar containing chewing gum's sweetness or flavor intensity over time.

EXAMPLE 2

A chewing gum was prepared by mixing ingredients according to the formulation of Table 2. Said formulation was used to test five variant samples.

Sample 1 was comprised of 15% thaumatin, 55.25% distilled water, and 29.75% glycerin. A 0.2 gram quantity of this sample was then added to a sample of the gum described in Table 2 so that the thaumatin present in the chewing gum was 30 ppm by weight of the chewing gum.

Sample 2 was comprised of 15% thaumatin and 85% distilled water. A 0.2 gram quantity of this sample was then added to a sample of the gum described in Table 2 so that the thaumatin present in the chewing gum was 30 ppm by weight of the chewing gum.

Sample 3 was comprised of 15% thaumatin, 55.25% distilled water and 29.75% propylene glycol. A 0.2 gram quantity of this sample was then added to a sample of the gum base described in Table 2 so that the thaumatin present in the chewing gum was 30 ppm by weight of the chewing gum.

Sample 4 consisted of powder thaumatin. A 0.03 gram quantity of this sample was then added to a sample of the gum base described in Table 2 so that the thaumatin present in the chewing gum was 30 ppm by weight of the chewing gum.

Sample 5 consisted of the gum described in TABLE 2

TABLE 2

| | |
|---|---|
| Base | 25.50% |
| Sorbitol | 49.26% |
| Lycasin | 6.83% |
| Mannitol | 7.97% |
| Glycerin | 8.54% |
| Lecithin | 0.21% |
| Flavor | 1.44% |
| Color | 0.05% |
| Aspartame | 0.20% |
| | 100.00% |

Chewing tests by several expert panelist evaluating the five gum samples for time vs. intensity properties suggested that Samples 1, 2, 3 and 4 were slightly better quality than Sample 5. Accordingly, the use of an aqueous system and the addition of glycerin or the addition of propylene glycol to chewing gum ingredients does not adversely effect a sugarless chewing gum's sweetness or flavor intensity over time.

EXAMPLE 3

A chewing gum was prepared by mixing ingredients according to the formulation of Table 3. Said formulation was used to test four variant samples. Sample 1 was comprised of 15% thaumatin, 55.25% distilled water, and 29.75% glycerin. A 0.6 gram quantity of this sample was then added to a sample of the gum described in Table 3 so that the thaumatin present in the chewing gum was 90 ppm by weight of the chewing gum. Sample 2 was comprised of 15% thaumatin and 85% distilled water. A 0.6 gram quantity of this sample was then added to a sample of the gum described in Table 3 so that the thaumatin present in the chewing gum was 90 ppm by weight of the chewing gum.

Sample 3 was comprised of powder thaumatin. A 0.09 gram quantity of this sample was then added to a sample of the gum described in Table 3 so that the thaumatin present in the chewing gum was 90 ppm by weight of the chewing gum.

Sample 4 was comprised of the gum described in Table 3.

TABLE 3

| | |
|---|---|
| Base | 19.22% |
| Lecithin | 0.15% |
| Syrup | 14.75% |
| Gycerin | 1.30% |
| Sugar | 63.45% |
| Flavor | 1.13% |
| | 100.00% |

Chewing tests by a 10 member panel evaluating the four gum samples for time vs. intensity properties revealed that Samples 1, 2 and 3 were superior to Sample 4 with respect to sweetness and flavor intensity over time. Accordingly, the use of an aqueous system and the addition of glycerin to chewing gum ingredients does not adversely effect a sugar type chewing gum's sweetness or flavor intensity over time when thaumatin is added in an amount so that it comprises 90 ppm by weight of the chewing gum.

EXAMPLE 4

A chewing gum was prepared by mixing ingredients according to the formulation of Table 4. Said formulation was used to test four variant samples.

Sample 1 was comprised of 15% thaumatin 55.25% distilled water, and 29.75% glycerin. A 1.0 gram quantity of this sample was then added to a sample of the gum described in Table 4 so that the thaumatin present in the chewing gum was 150 ppm by weight of the chewing gum.

Sample 2 was comprised of 15% thaumatin and 85% distilled water. A 1.0 gram quantity of this sample was then added to a sample of the gum described in Table 4 so that the thaumatin present in the chewing gum was 150 ppm by weight of the chewing gum.

Sample 3 was comprised of powder thaumatin. A 0.15 gram quantity of this sample was then added to a sample of the gum described in Table 4 so that the thaumatin present in the chewing gum ingredients was 150 ppm by weight of the chewing gum.

Sample 4 was comprised of the gum described in Table 4.

TABLE 4

| | |
|---|---|
| Base | 25.50% |
| Sorbitol | 49.26% |
| Lycasin | 6.83% |
| Mannitol | 7.97% |
| Glycerin | 8.54% |
| Lecithin | 0.21% |
| Flavor | 1.44% |
| Color | 0.05% |
| Aspartane | 0.20% |
| | 100.00% |

Chewing tests by a 10 member panel evaluating the four gum samples for time vs. intensity properties revealed that Samples 1, 2 and 3 were superior to sample 4 with respect to sweetness and flavor intensity over time. Accordingly, when thaumatin is mixed with chewing gum via an aqueous solution containing glycerin, so that the thaumatin present in the chewing gum is 150 ppm by weight of the chewing gum, there is no adverse effect on a sugarless chewing gum's sweetness or flavor intensity over time.

We claim:

1. A method of making a chewing gum including thaumatin comprising the following steps:
   providing an aqueous thaumatin solution comprising thaumatin and a water miscible preservative wherein thaumatin is present in an amount from about 1% to about 25% by weight of the aqueous thaumatin solution, and the water miscible preservative is present in an amount from about 15% to about 60% by weight of the aqueous thaumatin solution;
   providing a chewing gum composition; and
   mixing the aqueous thaumatin solution and chewing gum composition so that thaumatin comprises from about 25 ppm to about 600 ppm by weight of the chewing gum composition.

2. The method of claim 1 wherein the water miscible preservative is selected from the group comprising: glycerin, propylene glycol, and mixtures thereof.

3. A method of making a chewing gum including thaumatin comprising the following steps:
   providing an aqueous thaumatin solution comprising thaumatin and a water miscible preservative selected from the group consisting of glycerin, propylene glycol, and mixtures thereof, wherein thaumatin is present in an amount from about 1% to about 25% by weight of the aqueous thaumatin solution, and the water miscible preservative is present in an amount from about 15% to about 60% by weight of the aqueous thaumatin solution;
   providing a chewing gum composition; and
   mixing the aqueous thaumatin solution and chewing gum composition so that thaumatin comprises from about 25 ppm to about 600 ppm by weight of the chewing gum composition.

4. A method of making a chewing gum including thaumatin comprising the following steps:
   providing an aqueous thaumatin solution comprising thaumatin and a water miscible preservative wherein thaumatin is present in an amount from about 10% to about 20% by weight of the aqueous thaumatin solution, and the water miscible preservative is present in an amount from about 25% to about 35% by weight of the aqueous thaumatin solution;
   providing a chewing gum composition; and
   mixing the aqueous thaumatin solution and chewing gum composition so that thaumatin comprises from about 90 ppm to about 200 ppm by weight of the chewing gum composition.

5. The method of claim 4 wherein the water miscible preservative is selected from the group comprising: glycerin, propylene glycol, and mixtures thereof.

6. A method of making a chewing gum including thaumatin comprising the following steps:
   providing an aqueous thaumatin solution comprising thaumatin and a water miscible preservative selected from the group consisting of glycerin, propylene glycol, and mixtures thereof, wherein thaumatin is present in an amount from about 10% to about 20% by weight of the aqueous thaumatin solution, and the water miscible preservation is present in an amount from about 25% to about 35% by weight of the aqueous thaumatin solution;
   providing a chewing gum composition; and
   mixing the aqueous thaumatin solution and the chewing gum composition so that thaumatin comprises from about 90 ppm to about 200 ppm by weight of the chewing gum composition.

* * * * *

UNITED STATES PATENT AND TRADEMARK OFFICE
CERTIFICATE OF CORRECTION

PATENT NO. : 4,940,589
DATED : July 10, 1990
INVENTOR(S) : Albert H. Chapdelaine Page 1 of 4

It is certified that error appears in the above-identified patent and that said Letters Patent is hereby corrected as shown below:

In column 1, line 27, please delete "Vander Loo" and substitute therefor --van der Loo--.

In column 2, line 16, after "matrix" please insert --,--.
In column 2, line 20, after "matrix" please insert --,--.
In column 2, line 23, after "release" please insert --,--.
In column 2, line 53, after "thaumatin" please insert --,--.
In column 2, line 55, after "water" please insert --,--.
In column 2, line 57, after "glycerin" please insert --,--.
In column 2, line 61, after "thaumatin" please insert --,--.
In column 2, line 63, after "water" please insert --,--.
In column 2, line 65, after "glycol" please insert --,--.
In column 3, line 4, after "gum" please insert --,--.
In column 3, line 33, after "gum" please insert --,--.

UNITED STATES PATENT AND TRADEMARK OFFICE
CERTIFICATE OF CORRECTION

PATENT NO. : 4,940,589
DATED : July 10, 1990
INVENTOR(S) : Albert H. Chapdelaine It is certified that error appears in the above-identified patent and that said Letters Patent is hereby corrected as shown below:

In column 3, line 36, please delete "such as" and substitute therefor --may include--.

In column 4, line 23, after "percent" please insert --,--.

In column 4, line 42, before "known" please insert --mixer--.

In column 4, line 51, before "bulking" please insert --a--.

In column 4, line 54, after "understood" please delete ",".

In column 4, line 66, please delete "limitation" and substitute therefor --limitations--.

In column 5, line 3, after "samples." please delete "Sample 1".

In column 5, line 4, before "was comprised" please begin a new paragraph by inserting --Sample 1--.

In column 5, line 11, please delete "Sample 2 was comprised of powder thaumatin. A".

In column 5, line 12, before "0.03" please begin a new paragraph by inserting --Sample 2 was comprised of powder thaumatin. A--.

UNITED STATES PATENT AND TRADEMARK OFFICE
CERTIFICATE OF CORRECTION

PATENT NO. : 4,940,589
DATED : July 10, 1990
INVENTOR(S) : Albert H. Chapdelaine Page 3 of 4

It is certified that error appears in the above-identified patent and that said Letters Patent is hereby corrected as shown below:

In column 5, line 15, after "chewing gum." please delete "Sample 3 was comprised of the gum".

In column 5, line 16, before "described" please begin a new paragraph by inserting --Sample 3 was comprised of the gum--.

In column 5, line 26, please delete "panelist" and substitute therefor --panelists--.

In column 5, line 61, please delete "TABLE 2" and substitute therefor --Table 2.--.

In column 6, line 8, please delete "panelist" and substitute therefor --panelists--.

In column 6, line 20, after "samples." please delete "Sample 1 was".

In column 6, line 21, before "comprised" please begin a new paragraph by inserting --Sample 1 was.--.

In column 6, lines 25 and 26, after "gum." please delete "Sample"; and before "2" please begin a new paragraph by inserting --Sample--.

In column 6, line 63, after "thaumatin" please insert --,--.

UNITED STATES PATENT AND TRADEMARK OFFICE
CERTIFICATE OF CORRECTION

PATENT NO.   :   4,940,589
DATED        :   July 10, 1990
INVENTOR(S)  :   Albert H. Chapdelaine It is certified that error appears in the above-identified patent and that said Letters Patent is hereby corrected as shown below:

In column 7, line 23, in TABLE 4 please delete "Aspartane" and substitute therefor --Aspartame--.

Signed and Sealed this

Fifteenth Day of June, 1993

Attest:

MICHAEL K. KIRK

Attesting Officer

Acting Commissioner of Patents and Trademarks